US008295987B2

(12) United States Patent
Gadre et al.

(10) Patent No.: US 8,295,987 B2
(45) Date of Patent: Oct. 23, 2012

(54) SYSTEMS AND METHODS FOR PERFORMANCE MONITORING AND IDENTIFYING UPGRADES FOR WIND TURBINES

(75) Inventors: Aniruddha Gadre, Schenectady, NY (US); Abraham Morales, Madrid (ES); Nizar Yaghi, Austin, TX (US); Valika Wan, Schenectady, NY (US); Venkata Subramaniyan, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/947,444

(22) Filed: Nov. 16, 2010
(Under 37 CFR 1.47)

(65) Prior Publication Data
US 2011/0145277 A1    Jun. 16, 2011

(30) Foreign Application Priority Data
Mar. 31, 2010    (EP) ..................................... 10382075

(51) Int. Cl.
*F03D 7/00*    (2006.01)
(52) U.S. Cl. ........................... 700/286; 290/44; 702/188
(58) Field of Classification Search .......... 700/286–290; 701/99; 702/188; 290/44
See application file for complete search history.

(56) References Cited

U.S. PATENT DOCUMENTS

| 6,925,385 | B2* | 8/2005 | Ghosh et al. ..................... 702/14 |
| 7,013,203 | B2* | 3/2006 | Moore et al. ................... 700/286 |
| 7,908,035 | B2* | 3/2011 | Kumar et al. .................. 700/286 |
| 8,032,614 | B2* | 10/2011 | Riesberg et al. ............... 709/220 |
| 2002/0029097 | A1* | 3/2002 | Pionzio et al. ................ 700/286 |
| 2008/0208429 | A1 | 8/2008 | Saravanapriyan et al. |

FOREIGN PATENT DOCUMENTS
EP    1494020 A1    1/2005
EP    2085843 A2    8/2009

OTHER PUBLICATIONS

Unknown, European Search Report for Application No. 10382075.9, Oct. 6, 2010, 7 pages, European Patent Office, Netherlands.

* cited by examiner

*Primary Examiner* — John R. Cottingham
*Assistant Examiner* — Douglas Lee
(74) *Attorney, Agent, or Firm* — James McGinness, Esq.; Armstrong Teasdale LLP

(57) ABSTRACT

A method for indicating a performance of a wind turbine is provided. Target performance data are created based at least in part on performance data for one or more wind turbines of interest. Baseline performance data are calculated based at least in part on performance data for a plurality of other wind turbines. The target performance data are compared to the baseline performance data to create a relative performance profile. In addition, a graphical representation of the relative performance profile may be created, and an available upgrade for the wind turbines of interest may be evaluated based at least in part on performance data for one or more wind turbines including the available upgrade.

20 Claims, 10 Drawing Sheets

SYSTEMS AND METHODS FOR PERFORMANCE MONITORING AND IDENTIFYING UPGRADES FOR WIND TURBINES

BACKGROUND OF THE INVENTION

The subject matter described herein relates generally to monitoring wind turbines and, more particularly, to a system and method for comparing performance data for one or more wind turbines to performance data for other wind turbines and evaluating potential performance-enhancing upgrades.

Wind turbines utilize wind energy to generate or produce electrical power. Multiple wind turbines may be installed at a site to form a wind farm. To facilitate effective operation of a wind turbine, at least some known monitoring systems collect performance data from one or more wind turbines. An operator, for example, may review performance data for a particular wind turbine or a wind farm over time. However, such monitoring systems do not provide any indication of how the performance of a wind turbine or a wind farm compares to other wind turbines or wind farms. As a result, it may not be evident to an operator that a wind turbine or wind farm is operating at a performance level below its potential.

A need therefore exists for a system that provides wind turbine performance data in relation to performance data for other wind turbines. A need also exists for a system that provides information about upgrades which may enhance the performance of a wind turbine or a wind farm, such as a wind turbine or a wind farm operating at a performance level below its potential.

BRIEF DESCRIPTION OF THE INVENTION

In one aspect, a system for indicating a performance of a wind turbine is provided. The system includes a database system for storing performance data for a plurality of known wind turbines. The system also includes a server system coupled to the database system. The server system is configured to acquire, from the database system, performance data corresponding to one or more target wind turbines to create target performance data. The target wind turbines include a subset of the known wind turbines. The server system is also configured to acquire, from the database system, performance data corresponding to one or more baseline wind turbines to create baseline performance data. The baseline wind turbines include a subset of the known wind turbines that are not included in the target wind turbines. The server system is further configured to provide, to a client system, a relative performance profile relating the target performance data to the baseline performance data.

In another aspect, a method for indicating a performance of a wind turbine is provided. The method includes acquiring performance data for one or more target wind turbines to create target performance data. Baseline performance data are calculated by a processor based at least in part on performance data for a plurality of baseline wind turbines. The target performance data are compared, by the processor, to the baseline performance data to create a relative performance profile. A graphical representation of the relative performance profile is created for display by a user computer device.

In yet another aspect, a system for indicating a predicted performance improvement for an upgrade to a wind turbine is provided. The system includes a database system for storing performance data for a plurality of known wind turbines and a server system coupled to the database system. The server system is configured to provide, to a client system, a relative performance profile relating performance data for a target wind turbine to performance data for one or more baseline wind turbines. The server system is also configured to identify an available upgrade not included in the target wind turbine and to compare the performance data corresponding to the target wind turbine to performance data corresponding to one or more known wind turbines including the available upgrade to determine a predicted performance improvement. The server system is further configured to provide the predicted performance improvement to the client system.

DETAILED DESCRIPTION OF THE INVENTION

The embodiments described herein facilitate comparative performance monitoring of one or more wind turbines of interest (referred to as "target wind turbines") and evaluation of potential upgrades by providing a relative performance profile for the target wind turbines. A relative performance profile describes performance of the target wind turbines in relation to performance of other wind turbines, referred to as "baseline wind turbines." The target wind turbines and the baseline wind turbines are intersecting or non-intersecting subsets of a population of known wind turbines. An upgrade for a wind turbine may include, without limitation, a hardware component (e.g., a pitch control mechanism), a software component (e.g., control software), and/or a consumable component (e.g., a lubricant).

A relative performance profile includes and/or is based on target performance data corresponding to the target wind turbines and to baseline performance data corresponding to the baseline wind turbines. For example, performance data may include, without limitation, fault occurrence data, electrical output data, availability data, and/or any data describing operation of one or more wind turbines. Fault occurrence data include, without limitation, an occurrence of an excessively high temperature ("overtemperature"), an occurrence of an excessive rotor speed ("overspeed"), an occurrence of a deviation between a desired operating parameter and an actual operating parameter (e.g., a pitch control deviation), and/or an occurrence of any condition deemed detrimental to operation of a wind turbine.

In one embodiment, a wind turbine controller creates an operating condition value (e.g., based on a signal from a sensor) and transmits the operating condition value to a first server computer device, which transmits the operating condition value to a second server computer device. The wind turbine controller, the first server computer device, and/or the second server computer device may calculate performance data based at least in part on the operating condition value.

An exemplary technical effect of the methods and systems described herein includes at least one of: (a) acquiring performance data for one or more target wind turbines to create target performance data; (b) calculating baseline performance data based at least in part on performance data for a plurality of baseline wind turbines; (c) comparing the target performance data to the baseline performance data to create a relative performance profile; and, (d) creating a graphical representation of the relative performance profile for display by a user computer device.

Figure 1:
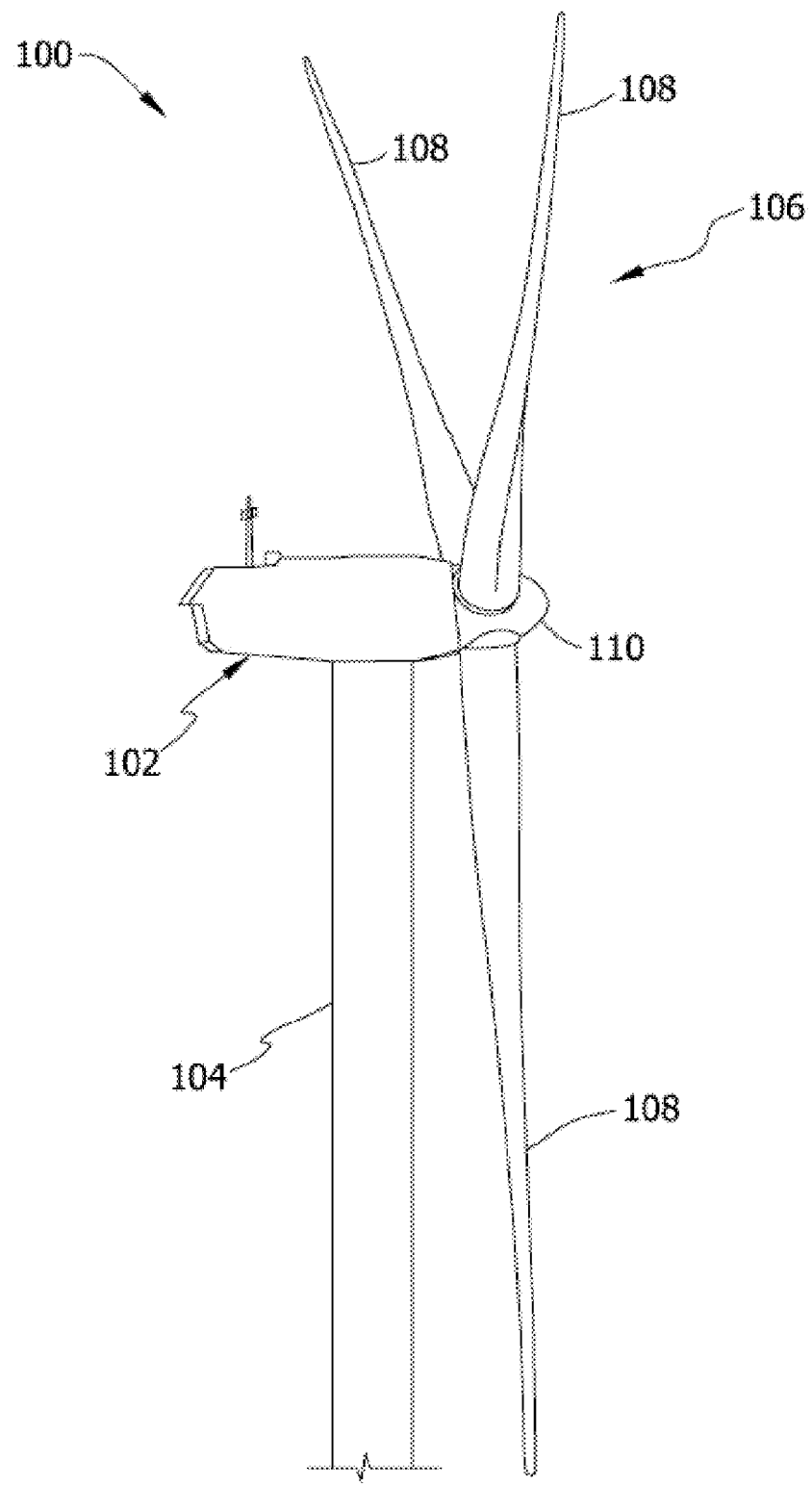
FIG. 1 is a perspective view of an exemplary wind turbine.

FIG. 1 is a perspective view of an exemplary wind turbine 100. Wind turbine 100 includes a nacelle 102 that houses a generator (not shown in FIG. 1). Nacelle 102 is mounted on a tower 104 (only a portion of tower 104 is shown in FIG. 1). Tower 104 may have any suitable height that facilitates operation of wind turbine 100 as described herein. In an exemplary embodiment, wind turbine 100 also includes a rotor 106 that includes three rotor blades 108 coupled to a rotating hub 110. Alternatively, wind turbine 100 may include any number of rotor blades 108 that enable operation of wind turbine 100 as described herein. In an exemplary embodiment, wind turbine 100 includes a gearbox (not shown) that is rotatingly coupled to rotor 106 and to the generator.

Figure 2:
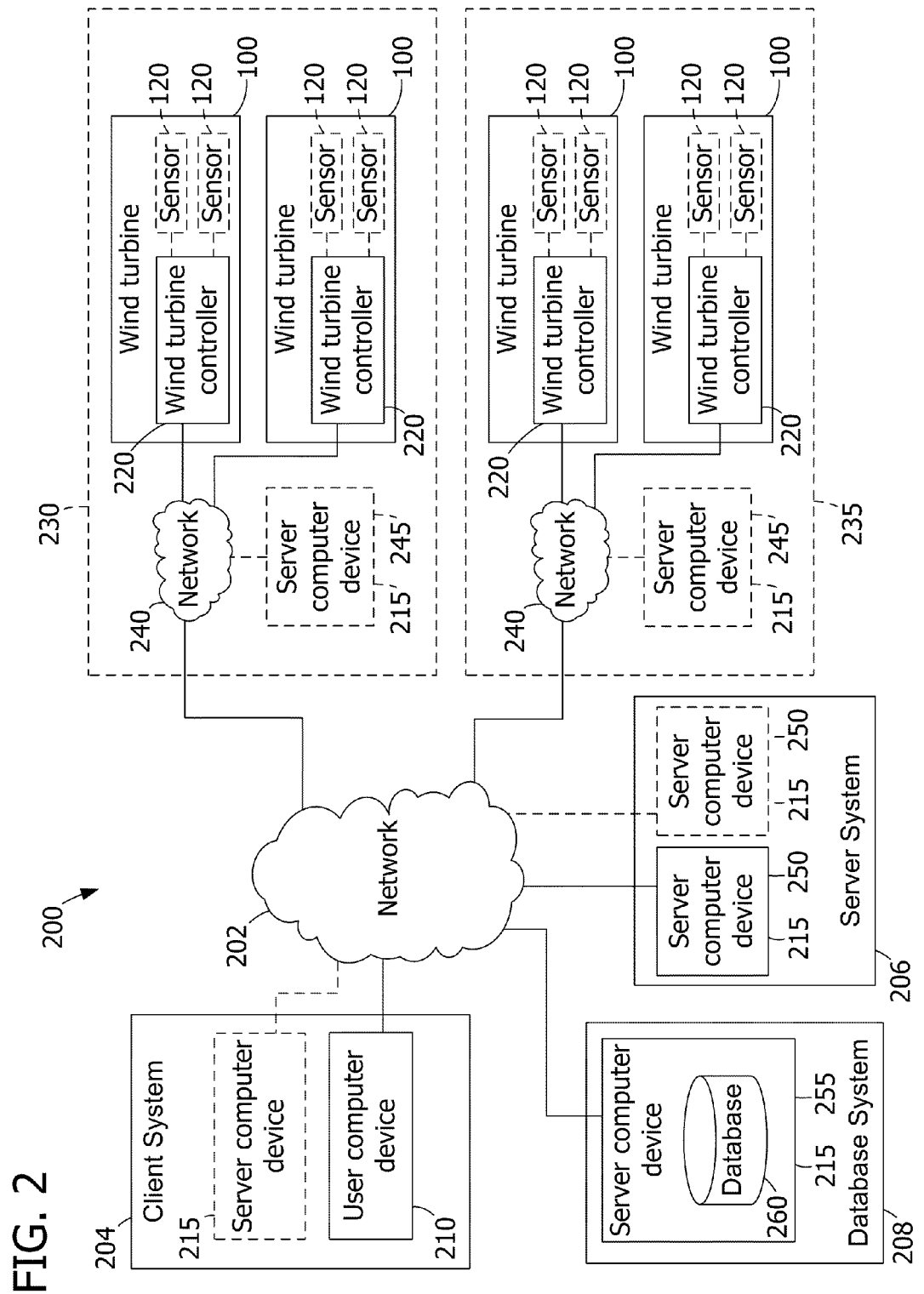
FIG. 2 is a block diagram illustrating an exemplary system for monitoring the wind turbine or multiple wind turbines as shown in FIG. 1.
Figure 3:
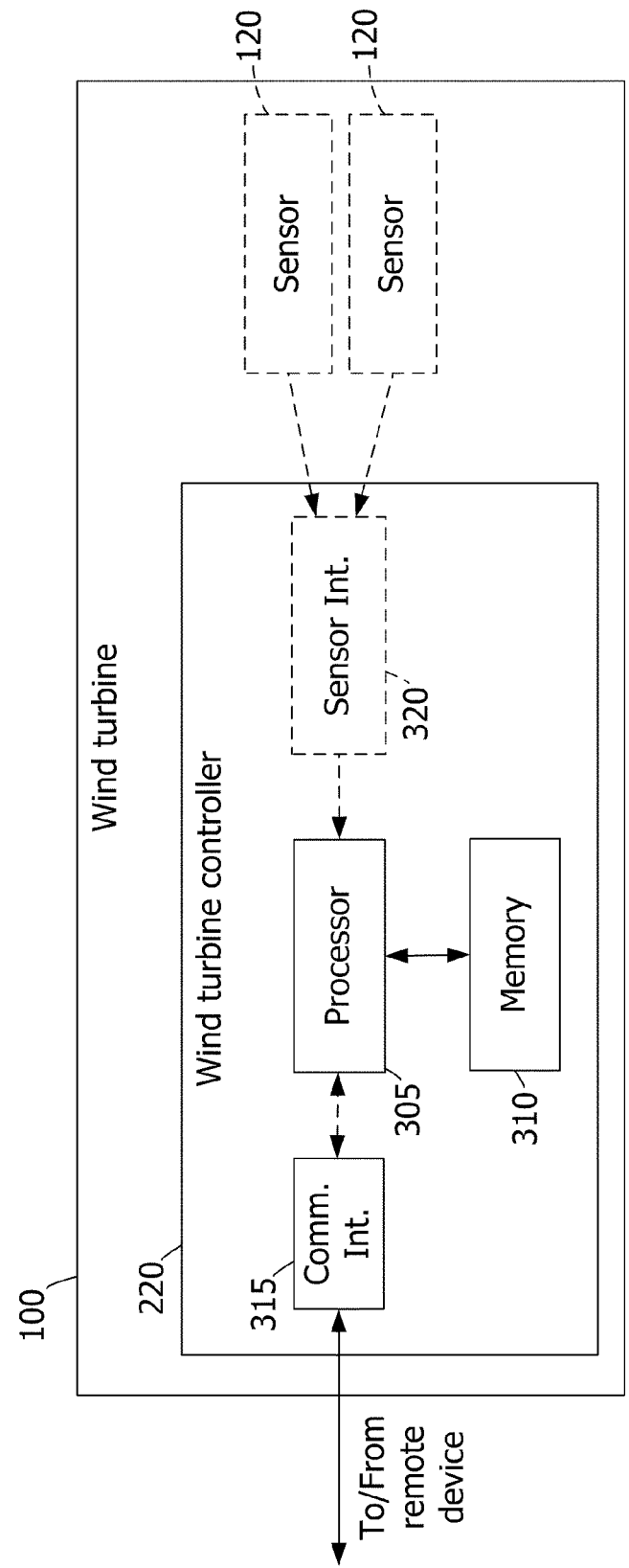
FIG. 3 is a block diagram illustrating an exemplary wind turbine controller for use with the system shown in FIG. 2.

In some embodiments, wind turbine 100 includes one or more sensors 120 (shown in FIGS. 2 and 3). Sensors 120 sense or detect wind turbine operating conditions. For example, sensor(s) 120 may include a turbine speed sensor, an electrical output sensor, an anemometer, a gear ratio sensor, and/or any sensor suitable for use with wind turbine 100. Each sensor 120 is located according to its function. For example, an electrical output sensor may be positioned within nacelle 102 or tower 104, inline with or adjacent to an output cable coupled to the generator, such that the electrical output sensor detects a voltage, a current, and/or a power transmitted via the output cable.

Each sensor 120 generates and transmits one or more signals corresponding to a detected operating condition. For example, an electrical output sensor transmits a signal indicating a voltage, a current, and/or a power detected on an output cable. Moreover, each sensor 120 may transmit a signal continuously, periodically, or only once, for example, though other signal timings are also contemplated. Furthermore, each sensor 120 may transmit a signal either in an analog form or in a digital form. Operation conditions and/or performance data may be created based on one or more sensor signals.

FIG. 2 is a block diagram illustrating an exemplary system 200 for monitoring one or more wind turbines 100. System 200 includes a network 202. For example, network 202 may include, without limitation, the Internet, a local area network (LAN), a wide area network (WAN), a wireless LAN (WLAN), a mesh network, and/or a virtual private network (VPN). System 200 also includes a client system 204, a server system 206, and a database system 208.

Client system 204 includes one or more user computer devices 210 and one or more server computer devices 215. Server system 206 and database system 208 include one or more server computer devices 215. System 200 also includes one or more wind turbine controllers 220.

User computer device 210, server computer device 215, and wind turbine controller 220 communicate with each other and/or network 202 using a wired network connection (e.g., Ethernet or an optical fiber), a wireless communication means, such as radio frequency (RF), an Institute of Electrical and Electronics Engineers (IEEE) 802.11 standard (e.g., 802.11(g) or 802.11(n)), the Worldwide Interoperability for Microwave Access (WIMAX) standard, a cellular phone technology (e.g., the Global Standard for Mobile communication (GSM)), a satellite communication link, and/or any other suitable communication means. WIMAX is a registered trademark of WiMax Forum, of Beaverton, Oreg. IEEE is a registered trademark of Institute of Electrical and Electronics Engineers, Inc., of New York, N.Y.

In an exemplary embodiment, system 200 includes a first wind turbine site 230 and a second wind turbine site 235. First wind turbine site 230 and second wind turbine site 235 each include a site network 240. Wind turbine controllers 220 and, optionally, site server computer devices 245 are coupled in communication with network 202 via site networks 240.

In addition, or alternatively, one or more server computer devices 215 may be communicatively coupled to network 202 from a location other than a wind farm. In one embodiment, one or more central server computer devices 250 included in server system 206 are communicatively coupled to network 202. For example, central server computer device 250 may be located in a centralized monitoring and/or control facility. Central server computer device 250 communicates with one or more site server computer devices 245 and/or one or more wind turbine controllers 220 at one or more wind turbine sites 230, 235. Such an embodiment facilitates monitoring multiple wind turbine sites 230, 235 from a remote location.

Also communicatively coupled to network 202 is a database server computer device 255, which is included in database system 208. Database server computer device 255 includes a database 260 for storing wind turbine data, including, without limitation, wind turbine site attributes, wind turbine attributes, and/or wind turbine performance data.

Figure 4:
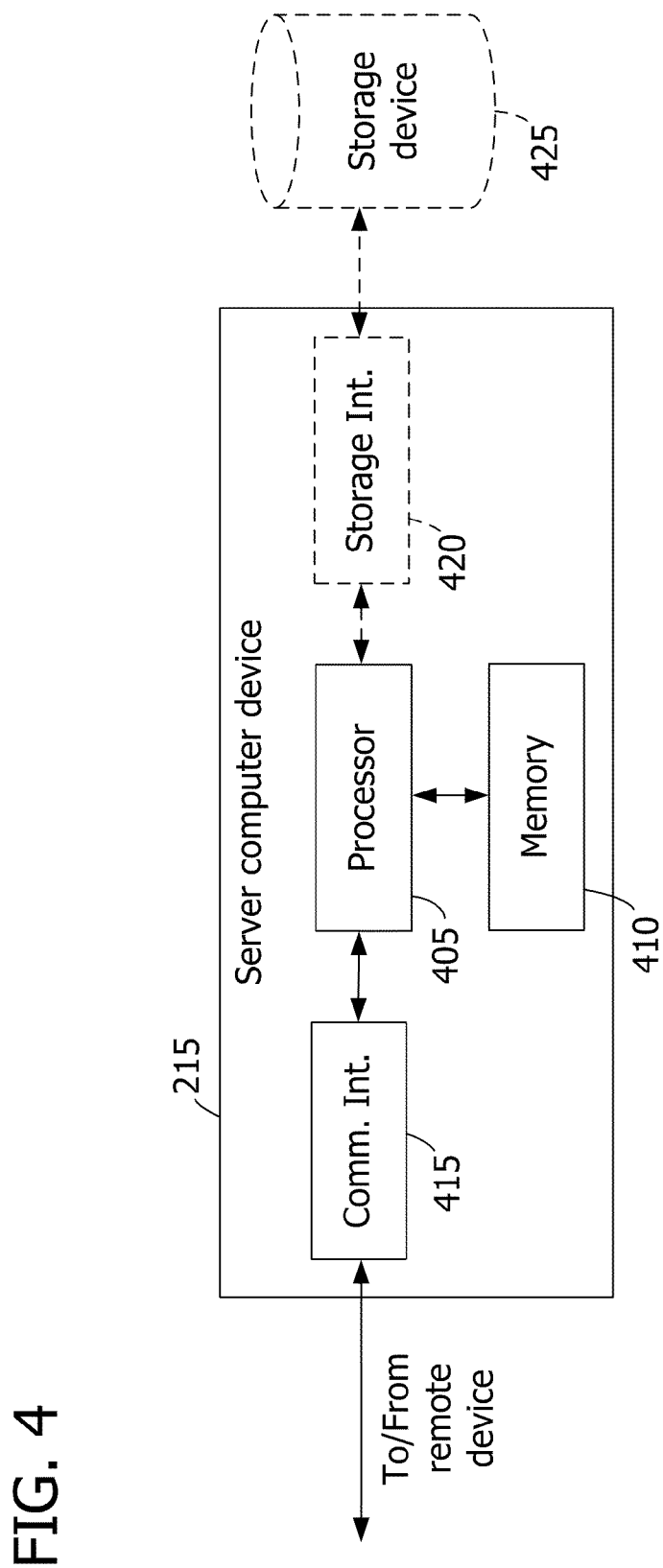
FIG. 4 is a block diagram illustrating an exemplary server computer device for use with the system shown in FIG. 2.
Figure 5:
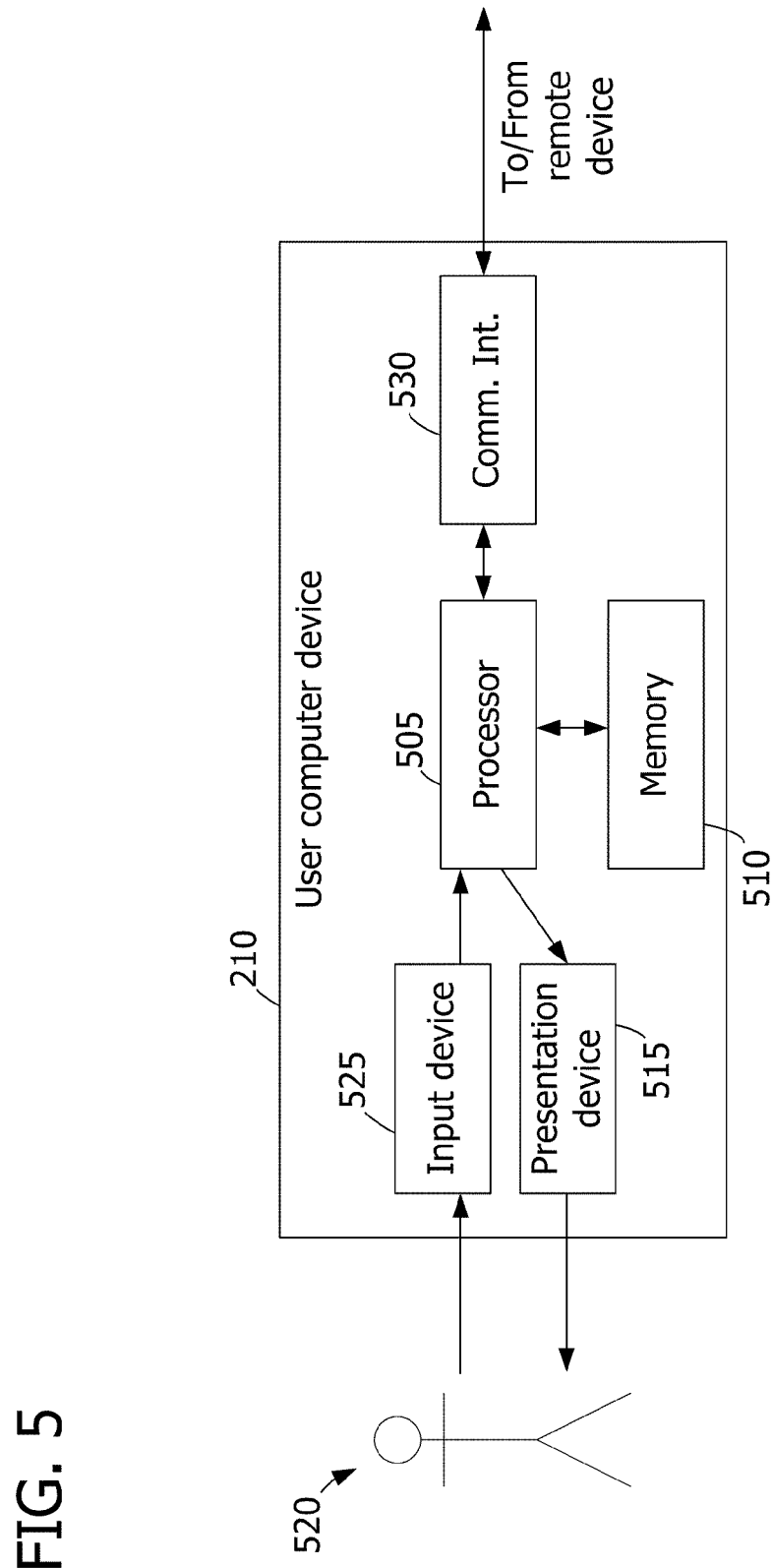
FIG. 5 is a block diagram illustrating an exemplary user computer device for use with the system shown in FIG. 2.

Each of user computer device 210, server computer devices 215, and wind turbine controllers 220 includes a processor, as shown in FIGS. 3-5. A processor may include a processing unit, such as, without limitation, an integrated circuit (IC), an application specific integrated circuit (ASIC), a microcomputer, a programmable logic controller (PLC), and/or any other programmable circuit. A processor may include multiple processing units (e.g., in a multi-core configuration). Each of user computer device 210, server computer device 215, and wind turbine controller 220 is configurable to perform the operations described herein by programming the corresponding processor. For example, a processor may be programmed by encoding an operation as one or more executable instructions and providing the executable instructions to the processor by embodying the executable instructions in a memory area (also shown in FIGS. 3-5) coupled to the processor. A memory area may include, without limitation, one or more random access memory (RAM) devices, one or more storage devices, and/or one or more computer readable media.

Client system 204, server system 206, and database system 208 each include one or more computer devices 210, 215. Client system 204, server system 206, and database system 208 may be configured to operate as described herein by configuring and/or by programming computer devices 210, 215. For example, server system 206 may be considered coupled to network 202 because central server computer device 250 is coupled to network 202.

FIG. 3 is a block diagram illustrating an exemplary wind turbine controller 220 for use with system 200. Wind turbine controller 220 includes a processor 305 for executing instructions. For example, instructions may be stored in a memory area 310, which is coupled to processor 305, to program processor 305.

Wind turbine controller 220 also includes a communication interface 315. Communication interface 315 is configured to be coupled in communication with one or more remote devices, such as user computer device 210 and/or server computer devices 215. For example, communication interface 315 may be coupled in communication with a remote device via network 202.

In some embodiments, wind turbine controller 220 includes one or more sensor interfaces 320. Sensor interface 320 is configured to be coupled in communication with one or more sensors 120 of wind turbine 100. Sensor interface 320 may be configured to receive one or more signals from each sensor 120.

In one embodiment, wind turbine controller 220 receives one or more signals from sensor 120 via sensor interface 320 and processes the signal(s) by processor 305 to create one or more operating condition values. In some embodiments, processor 305 is programmed (e.g., with executable instructions in memory area 310) to sample a signal produced by sensor 120. For example, processor 305 may receive a continuous signal from sensor 120 and, in response, produce an operating condition value based on the continuous signal periodically (e.g., once every five seconds). In some embodiments, processor 305 normalizes a signal received from sensor 120. For example, an electrical output sensor may produce an analog signal with a parameter (e.g., voltage) that is directly proportional to a measured power output. Processor 305 may be programmed to convert the analog signal to a power output value (e.g., expressed in kilowatts).

In an exemplary embodiment, processor 305 is programmed to create performance data based at least in part on one or more operating condition values. For example, performance data may include operating condition values. In addition, or alternatively, processor 305 may calculate performance data based on operating condition values. For example, processor 305 may calculate a hourly average power output based on operating condition values corresponding to a one-hour duration. Processor 305 may be programmed to record performance data in memory area 310.

Wind turbine controller 220 may be configured to provide operating condition values and/or performance data to a remote device, such as server computer devices 215 or user computer device 210, via communication interface 315. In one embodiment, wind turbine controller 220 is configured to provide performance data to central server computer device 250.

Various connections are available between sensor interface 320 and sensor 120. Such connections include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, a private (e.g., accessible only inside or proximate to wind turbine 100) network connection, whether wired or wireless, and/or any other connection type suitable for carrying communication and/or data signals. BLUETOOTH is a registered trademark of Bluetooth SIG, Inc., of Bellevue, Wash.

FIG. 4 is a block diagram illustrating an exemplary server computer device 215 for use with system 200. Server computer device 215 includes a processor 405 for executing instructions. Instructions may be stored in a memory area 410, for example. Instructions may be provided for executing server applications including, without limitation, a wind turbine monitoring system, a wind turbine upgrade planning system, and/or database 260.

Processor 405 is operatively coupled to a communication interface 415 such that server computer device 215 is capable of communicating with a remote device, such as one or more user computer devices 210, wind turbine controllers 220, and/or other server computer devices 215. Processor 405 may also be operatively coupled to a storage device 420. Storage device 420 is any computer-operated hardware suitable for storing and/or retrieving data. In some embodiments, storage device 420 is integrated in server computer device 215. For example, server computer device 215 may include one or more hard disk drives as storage device 420. In other embodiments, storage device 420 is external to server computer device 215 and may be accessed by a plurality of server computer devices 215. For example, storage device 420 may include multiple storage units, such as hard disks or solid state disks, in a redundant array of inexpensive disks (RAID) configuration. Storage device 420 may include a storage area network (SAN) and/or a network attached storage (NAS) system.

In some embodiments, processor 405 is operatively coupled to storage device 420 via a storage interface 425. Storage interface 425 is any component capable of providing processor 405 with access to storage device 420. Storage interface 425 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 420.

Server computer device 215 may be configured to store wind turbine data in memory area 410 and/or storage device 425. For example, storage device 425 may include wind turbine site data and/or wind turbine data for a plurality of users 520.

Wind turbine site data include wind turbine site attributes, such as an identification attribute (e.g., a name), an operator attribute (e.g., an entity that operates the wind turbine site), a dimensional attribute (e.g., an area), a geographic attribute (e.g., a latitude, a longitude, and/or an elevation), a locale (e.g., a city and/or a country), and/or an environmental attribute. Wind turbine data include wind turbine attributes, such as an identification attribute (e.g., a name), an operator attribute, a dimensional attribute (e.g., a rotor disc area and/or a tower height), a component attribute (e.g., a set of included components), an electrical output attribute (e.g., a maximum power output), a geographic attribute (e.g., a latitude, a longitude, and/or an elevation), and/or an environmental attribute. Environmental attributes include, without limitation, temperature, humidity, salinity, and/or a wind condition, such as wind direction and/or wind speed. Environmental attributes may be expressed as a yearly average, a seasonal average, a moving average, and/or any other form suitable for describing an operating environment of a wind turbine. In an exemplary embodiment, memory area 410 and/or storage device 425 is also configured to store performance data corresponding to a plurality of wind turbines 100.

FIG. 5 is a block diagram illustrating an exemplary user computer device 210 for use with system 200. User computer device 210 includes a processor 505 for executing instructions. In some embodiments, executable instructions are stored in a memory area 510. Memory area 510 is any device allowing information, such as executable instructions and/or other data, to be stored and retrieved.

User computer device 210 also includes at least one presentation device 515 for presenting information to user 520. Presentation device 515 is any component capable of conveying information to user 520. Presentation device 515 may include, without limitation, a display device (e.g., a liquid crystal display (LCD), organic light emitting diode (OLED) display, or "electronic ink" display) and/or an audio output device (e.g., a speaker or headphones). In some embodiments, presentation device 515 includes an output adapter, such as a video adapter and/or an audio adapter. An output adapter is operatively coupled to processor 505 and configured to be operatively coupled to an output device, such as a display device or an audio output device.

In some embodiments, user computer device 210 includes an input device 525 for receiving input from user 520. Input device 525 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 515 and input device 525. User computer device 210 also includes a communication interface 530, which is configured to be coupled in communication with network 202, server computer devices 215, and/or wind turbine controllers 220.

Stored in memory area 510 are, for example, computer readable instructions for providing a user interface to user 520 via presentation device 515 and, optionally, receiving and processing input from input device 525. A user interface may include, among other possibilities, a web browser and/or a client application. Web browsers and client applications enable users, such as user 520, to display and interact with media and other information from a remote device, such as server computer devices 215. Exemplary client applications include, without limitation, a wind turbine monitoring and/or management application.

In an exemplary embodiment, wind turbine controllers 220 and/or site server computer devices 245 are configured to record performance data corresponding to one or more known wind turbines 100. For example, site server computer devices 245 may be configured to acquire performance data for wind turbines 100 from wind turbine controllers 220 within a corresponding wind turbine site 230, 235.

Database server computer device 255 is configured to store the performance data for one or more known wind turbines 100. In one embodiment, database server computer device 255 is configured to receive the performance data from site server computer devices 245 and/or wind turbine controllers 220. In an alternative embodiment, central server computer device 250 is configured to acquire the performance data from site server computer devices 245 and/or wind turbine controllers 220 and to store the acquired performance data in database 260 of database server computer device 255.

Database server computer device 255 may be configured to store performance data for a wind turbine site 230, 235 that is provided by site server computer device 245 and/or wind turbine controllers 220. The site performance data may be included in target performance data and/or baseline performance data. Furthermore, performance data corresponding to wind turbine sites 230, 235 may include performance data corresponding to individual wind turbines 100. If all wind turbines 100 within a wind turbine site 230, 235 are defined as target wind turbines, the site performance data may be used as the target performance data. If one wind turbine 100 within a wind turbine site 230, 235 is defined as a target wind turbine, the performance data corresponding to the individual wind turbine 100 may be used as the target performance data. Target performance data and/or baseline performance data may include performance data corresponding to multiple wind turbine sites 230, 235.

In some embodiments, database server computer device 255 is configured to store recent (e.g., generated in the previous day, the previous week, or the previous month) performance data for one or more wind turbines 100. For example, database server computer device 255 and/or central server computer device 250 may be configured to repeatedly acquire and store performance data for one or more wind turbines 100. In one embodiment, central server computer device 250 is configured to periodically acquire performance data from site server computer devices 245 and/or wind turbine controllers 220 and store the performance data in database 260. For example, central server computer device 250 may be configured to transmit a performance data request to a site server computer device 245 according to an interval, such as one minute, thirty minutes, one hour, or twenty-four hours. The recent performance data may be included in target performance data and/or baseline performance data when creating a relative performance profile, as described in more detail below. Such embodiments facilitate comparative performance monitoring in real time or near real time.

Central server computer device 250 is configured to acquire, from database 260, performance data corresponding to one or more target wind turbines to create target performance data. The target wind turbines include a subset of known wind turbines 100. Central server computer device 250 is also configured to acquire, from database 260, performance data corresponding to one or more baseline wind turbines to create baseline performance data. The baseline wind turbines include a subset of known wind turbines 100 that are not included in the target wind turbines. For example, the target performance data may correspond to first wind turbine site 230, and the baseline performance data may correspond to second wind turbine site 235. The target wind turbines may or may not also be included in the baseline wind turbines. In an exemplary embodiment, the performance data are continually updated in database 260. The target performance data and the baseline performance data reflect current and/or recent performance of the corresponding wind turbines 100.

The target wind turbines and/or baseline wind turbines may be defined at user computer device 210 by user 520. For example, input device 525 may be configured to receive a definition of target wind turbines and/or baseline wind turbines, and communication interface 530 may be configured to transmit the definition of target wind turbines to central server computer device 250.

In some embodiments, central server computer device 250 is configured to receive a definition of target wind turbines from client system 204 and to define the baseline wind turbines based on the definition of target wind turbines. For example, central server computer device 250 may be configured to identify known wind turbines 100 having at least one attribute that is substantially similar to an attribute of the target wind turbines. Attributes may include, without limitation, a geographic attribute and/or an environmental attribute. In addition, or alternatively, central server computer device 250 may be configured to identify known wind turbines 100 having different (e.g., upgraded) components when compared to the target wind turbines. Such embodiments facilitate automatic selection and/or generation of baseline data for one or more target wind turbines, without requiring user 520 to determine which known wind turbines 100 are suitable for comparison to the target wind turbines.

Central server computer device 250 is further configured to provide, to client system 204, a relative performance profile relating the target performance data to the baseline performance data. For example, central server computer device 250 may be configured to compare the target performance data to the baseline performance data to create a relative performance profile for the target wind turbines.

Central server computer device 250 may also be configured to calculate target performance data and/or baseline performance data based at least in part on the performance data. In one embodiment, central server computer device 250 calculates the baseline performance data and stores the baseline performance data in database 260. In an alternative embodiment, central server computer device 250 calculates the baseline performance data dynamically (e.g., to create the relative performance profile) and subsequently discards and/or deletes the baseline performance data.

In one embodiment, the performance data include fault occurrence data. Central server computer device 250 is programmed to compare fault occurrence data from the target performance data with fault occurrence data from the baseline performance data to create the relative performance profile. Other forms of performance data, such as electrical output and availability, may also be compared to create the relative performance profile.

Central server computer device 250 may also be configured to create a graphical representation of the relative performance profile. In some embodiments, communication interface 415 is configured to transmit the relative performance profile and/or the graphical representation thereof to a remote device, such as user computer device 210.

In an exemplary embodiment, communication interface 530 is configured to receive a graphical representation of a relative performance profile from a remote device, such as central server computer device 250. Presentation device 515 is configured to display the graphical representation of the relative performance profile. In an alternative embodiment, communication interface 530 is configured to receive the relative performance profile, processor 505 is programmed to create a graphical representation of the relative performance profile, and presentation device 515 is configured to display the graphical representation of the relative performance profile.

In one embodiment, the target performance data corresponds to wind turbines 100 at first wind turbine site 230. For example, central server computer device 250 may be configured to create the target performance data by selecting from database 260 the performance data corresponding to wind turbines 100 included in first wind turbine site 230. Central server computer device 250 is further configured to calculate baseline performance data based at least in part on performance data corresponding to wind turbines 100 at second wind turbine site 235. Central server computer device 250 is also configured to compare the target performance data to the baseline performance data to create a relative performance profile for first wind turbine site 230. Such an embodiment facilitates monitoring the performance of first wind turbine site 230 relative to the performance of second wind turbine site 235.

In some embodiments, central server computer device 250 is configured to calculate, as the baseline performance data, an average performance metric based at least in part on a portion of the stored performance data. An average performance metric may include, without limitation, an average fault occurrence rate, an average availability rate, and an average electrical output. In one embodiment, central server computer device 250 is also configured to calculate a target performance metric based at least in part on the target performance data. The target performance metric corresponds to the average performance metric. For example, both the average performance metric and the target performance metric may indicate fault occurrence rates. Central server computer device 250 is further configured to compare the target performance metric to the average performance metric to create the relative performance profile. Central server computer device 250 is configured to create a graphical representation of the relative performance profile by creating a graphical representation of the target performance metric relative to the average performance metric. For example, processor 405 may be programmed to create a chart including the target performance metric and the average performance metric (e.g., in juxtaposition).

In some embodiments, central server computer device 250 facilitates evaluating an upgrade to a component of one or more wind turbines 100. Processor 405 is programmed to identify an available upgrade for a first target wind turbine of the target wind turbines. The first target wind turbine does not already include the available upgrade. Processor 405 is also programmed to compare target performance data corresponding to the first target wind turbine to baseline performance data corresponding to one or more known wind turbines 100 that include the available upgrade to determine a predicted performance improvement. For example, a predicted performance improvement may be expressed as an increase in availability or a reduction in fault occurrences. Central server computer device 250 is configured to provide the predicted performance improvement to client system 204 (e.g., via communication interface 415).

Figure 6:
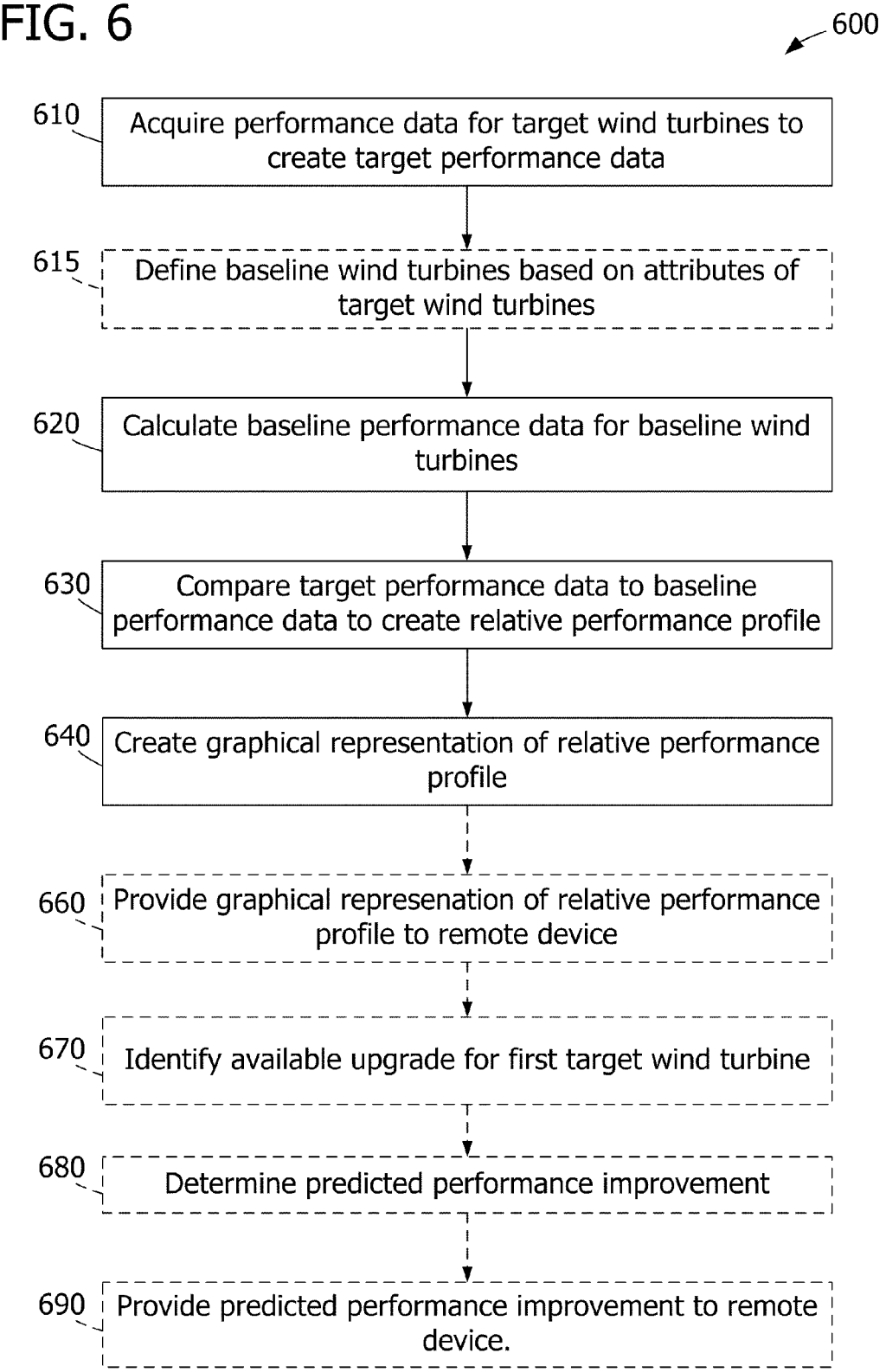
FIG. 6 is a flowchart of an exemplary method for indicating a performance of a wind turbine.

FIG. 6 is a flowchart of an exemplary method 600 for indicating a performance of a wind turbine, such as wind turbine 100, using an exemplary system as described herein. Method 600 includes acquiring 610 performance data for one or more target wind turbines to create target performance data. Baseline performance data are calculated 620 by a processor based at least in part on performance data for a plurality of baseline wind turbines.

The baseline wind turbines may be defined 615 by a user or automatically (e.g., by system 200 or central server computer device 250) based on one or more attributes of the target wind turbines. For example, the baseline wind turbines may be defined 615 by identifying known wind turbines having at least one attribute that is substantially similar to an attribute of the target wind turbines. Baseline performance data may be calculated 620 based on performance data corresponding to the defined baseline wind turbines. A wind turbine attribute may include, without limitation, a dimensional attribute (e.g., a rotor disc area and/or a tower height), a component attribute (e.g., a set of included hardware components, software components, and/or consumable components), an electrical output attribute (e.g., a maximum power output), a geographic attribute (e.g., a latitude, a longitude, and/or an elevation), and/or an environmental attribute (e.g., an average temperature and/or a wind condition). Wind conditions include, for example, an average wind speed and/or an occurrence rate of wind in one or more directions.

In addition, or alternatively, the baseline wind turbines may be defined 615 based on one or more component attributes of the target wind turbines. For example, known wind turbines having components similar and/or equivalent to the components of the target wind turbines may be defined 615 as the baseline wind turbines. In another example, known wind turbines having components that represent upgrades to the components of the target wind turbines are defined 615 as the baseline wind turbines.

The target performance data are compared 630, by the processor, to the baseline performance data to create a relative performance profile. A graphical representation of the relative performance profile is created 640 for display by a user computer device. In some embodiments, the graphical representation of the relative performance profile is provided 660 to a remote device, such as user computer device 210.

In an exemplary embodiment, the performance data include fault occurrence data. Target fault occurrence data are compared 630 to baseline fault occurrence data to create the relative performance profile.

Any number of known wind turbines may be included in the target wind turbines and the baseline wind turbines. In one embodiment, performance data are acquired 610 for wind turbines within one wind turbine site to create the target performance data. In addition, the baseline performance data may be calculated 620 based on performance data for wind turbines within one or more wind turbine sites. The target performance data are compared 630 to the baseline performance data to create a relative performance profile for the wind turbine site.

Some embodiments facilitate evaluating an upgrade to one or more wind turbines. In one embodiment, an available upgrade is identified 670 for a first target wind turbine that does not currently include the available upgrade. Target performance data for the first target wind turbine are compared 680 to performance data for at least one known wind turbine that includes the available upgrade to determine a predicted performance improvement that may be achieved upon implementation of the available upgrade. The wind turbines having the available upgrade may or may not be included in the baseline wind turbines. In an exemplary embodiment, the wind turbines with the available upgrade have at least one wind turbine attribute (e.g., a wind condition) that is substantially similar to a wind turbine attribute of the first target wind turbine.

The predicted performance improvement is provided 690 to a remote device, such as user computer device 210. For example, the availability of the first target wind turbine may be compared to the availability of the wind turbines including the available upgrade to determine an improvement in availability that would result from adding the available upgrade to the first target wind turbine.

Some embodiments facilitate determining an actual performance improvement achieved by an upgrade. For example, a user may implement an upgrade to one or more wind turbines based on a predicted performance improvement. After the upgrade is implemented, performance data for the upgraded wind turbine(s) is acquired 610 to create target performance data. The baseline wind turbines may be defined 615 as the same set of wind turbines previously used to determine the predicted performance improvement. Alternatively, the baseline wind turbines may be defined 615 to include any other wind turbines based on one or more attributes of the upgraded wind turbine(s), as described above. In one embodiment, baseline performance data is calculated 620 from performance data for the upgraded wind turbine(s) prior to application of the upgrade. The target performance data is compared 630 to the baseline performance data to create a relative performance profile that indicates an actual performance improvement achieved by implementing the upgrade. A graphical representation of the relative performance profile may be created 640 and may be further provided 660 to a remote device.

In some embodiments, the target wind turbines are associated with an operator attribute indicating that the target wind turbines are operated by a first operator. The baseline performance data include and/or are based on performance data for at least one wind turbine operated by a second operator. For example, the baseline performance data may be calculated based on performance data corresponding to multiple operators. In one embodiment, baseline performance data are provided with no identifying information for the corresponding operators. Such an embodiment facilitates comparing performance of a target wind turbine or a wind turbine site to performance of wind turbines and/or wind turbine sites owned and/or operated by other entities while keeping wind turbine operation details for each operator confidential.

Method 600 may facilitate purchasing an upgrade for one or more wind turbines. For example, providing 690 the predicted performance improvement to a remote device may include providing an option to purchase the available upgrade. In some embodiments, multiple available upgrades for one or more wind turbines may be selected for purchase, and the selected upgrades may be purchased in a single operation.

Figure 7:
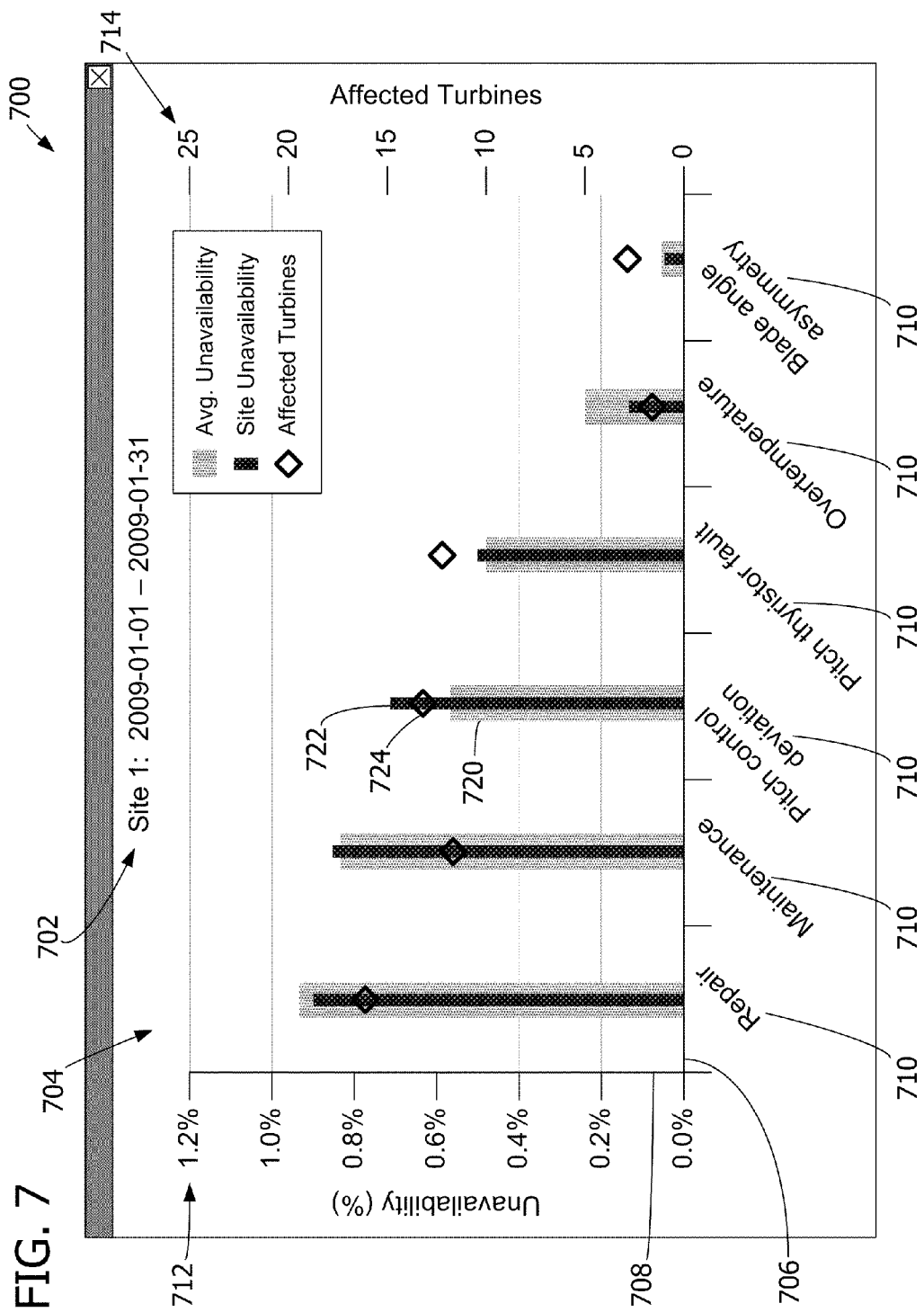
FIG. 7 is an exemplary user interface for providing a graphical representation of a relative performance profile for wind turbines at a wind turbine site of interest as shown in FIG. 2.

FIG. 7 is an exemplary user interface 700 providing a graphical representation of a relative performance profile for wind turbines 100 at a wind turbine site of interest, such as first wind turbine site 230. As shown in FIG. 7, the relative performance profile includes, as performance metrics, unavailability of wind turbines 100 due to various fault occurrences. User interface 700 may be displayed by user computer device 210, for example. User interface 700 includes a title 702 indicating the wind turbine site of interest and a date range for which performance data are displayed. User interface 700 also includes a bar chart 704 with an x-axis 706 and a y-axis 708. Plotted on x-axis 706 is a plurality of fault conditions 710. Plotted on y-axis 708 are unavailability (expressed as a percentage of time), denoted by graduations 712, and a quantity of affected turbines, denoted by graduations 714.

For each fault condition 710, bar chart 704 includes an average unavailability indicator 720, a site unavailability indicator 722, and an affected turbines indicator 724. As shown in FIG. 7, average unavailability indicator 720 and site unavailability indicator 722 are displayed as juxtaposed vertical bars. Affected wind turbines indicator 724 graphically represents a quantity of wind turbines 100 at the wind turbine site of interest that are associated with at least one occurrence of the corresponding fault condition.

Such an embodiment facilitates quickly comparing site performance to average performance and further facilitates identifying potentially beneficial upgrades. For example, an operator may determine, based on average unavailability indicator 720, site unavailability indicator 722, and/or affected wind turbines indicator 724, that an upgrade to pitch control components used at the wind turbine site of interest is desirable.

Figure 8:
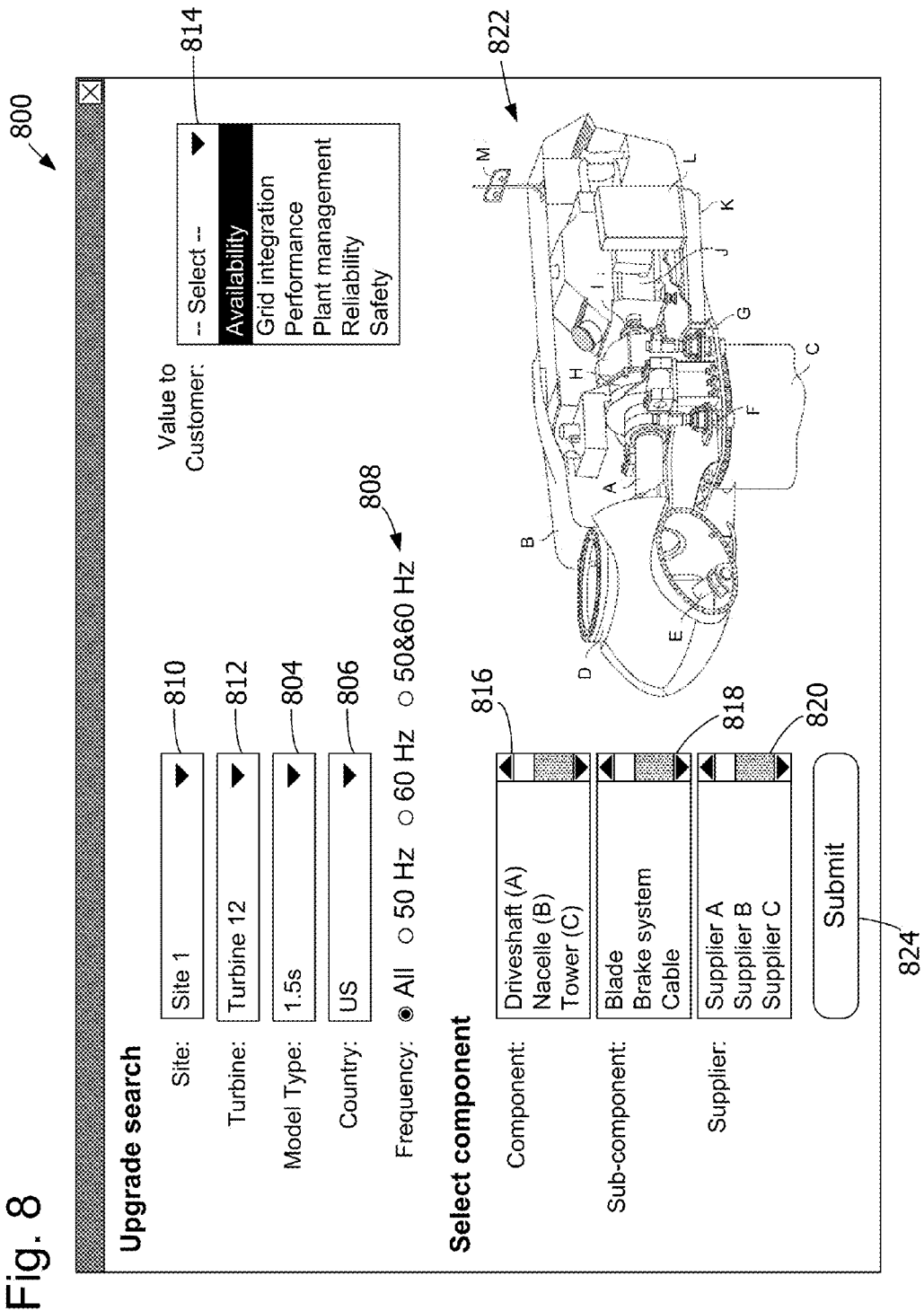
FIG. 8 is an exemplary user interface for determining available upgrades for a wind turbine such as shown in FIG. 1.

FIG. 8 is an exemplary user interface 800 for determining available upgrades for a wind turbine, such as wind turbine 100. User 520 may interact with user interface 800 via user computer device 210. As described in more detail below, information presented in user interface 800 may be customized for user 520. For example, user interface 800 may acquire wind turbine site data and/or wind turbine data for user 520 from user computer device 210 and/or server computer devices 215.

User interface 800 includes a model selector 804, a country selector 806, and a frequency selector 808. Model selector 804 includes a list of wind turbine models. Country selector 806 includes a list of countries in which the wind turbine model selected in model selector 804 is available. Frequency selector 808 includes a list of available electrical output frequencies.

In an exemplary embodiment, user interface 800 includes a site selector 810 and a wind turbine selector 812. Site selector 810 includes a list of wind turbine sites associated with user 520. For example site selector 810 may include wind turbine sites operated by user 520. Wind turbine selector 812 includes a list of wind turbines associated with the wind turbine site selected in site selector 810. In one embodiment, in response to user 520 selecting a wind turbine in wind turbine selector 812, user interface 800 automatically selects a model, a country, and/or a frequency corresponding to the selected wind turbine.

User interface 800 also includes a customer value selector 814. Customer value selector 814 includes a list of benefit categories associated with available upgrades. For example, an upgrade such as a guardrail may be associated with a benefit category of "safety."

User interface 800 also includes a component selector 816, a sub-component selector 818, and a supplier selector 820. Component selector 816 includes a list of wind turbine components. Sub-component selector 818 includes a list of sub-components for the component or components selected in component selector 816. Supplier selector 820 includes a list of suppliers for the sub-component or sub-components selected in sub-component selector 818. In some embodiments, user interface 800 determines the lists of values within component selector 816, sub-component selector 818, and/or supplier selector 820 based at least in part on the values selected model selector 804, country selector 806, frequency selector 808, and/or customer value selector 814.

In addition, or alternatively, user 520 may interact with wind turbine diagram 822 to select one or more components and/or sub-components. For example, user 520 may select a position within wind turbine diagram 822 corresponding to a component. In response, user interface 800 may automatically select the corresponding component in component selector 816.

User interface 800 also includes a submit button 824. In response to user 520 engaging submit button 824, user interface 800 initiates a search for upgrades using the values selected in model selector 804, country selector 806, frequency selector 808, site selector 810, wind turbine selector 812, customer value selector 814, component selector 816, sub-component selector 818, and/or supplier selector 820 as search criteria.

Figure 9:
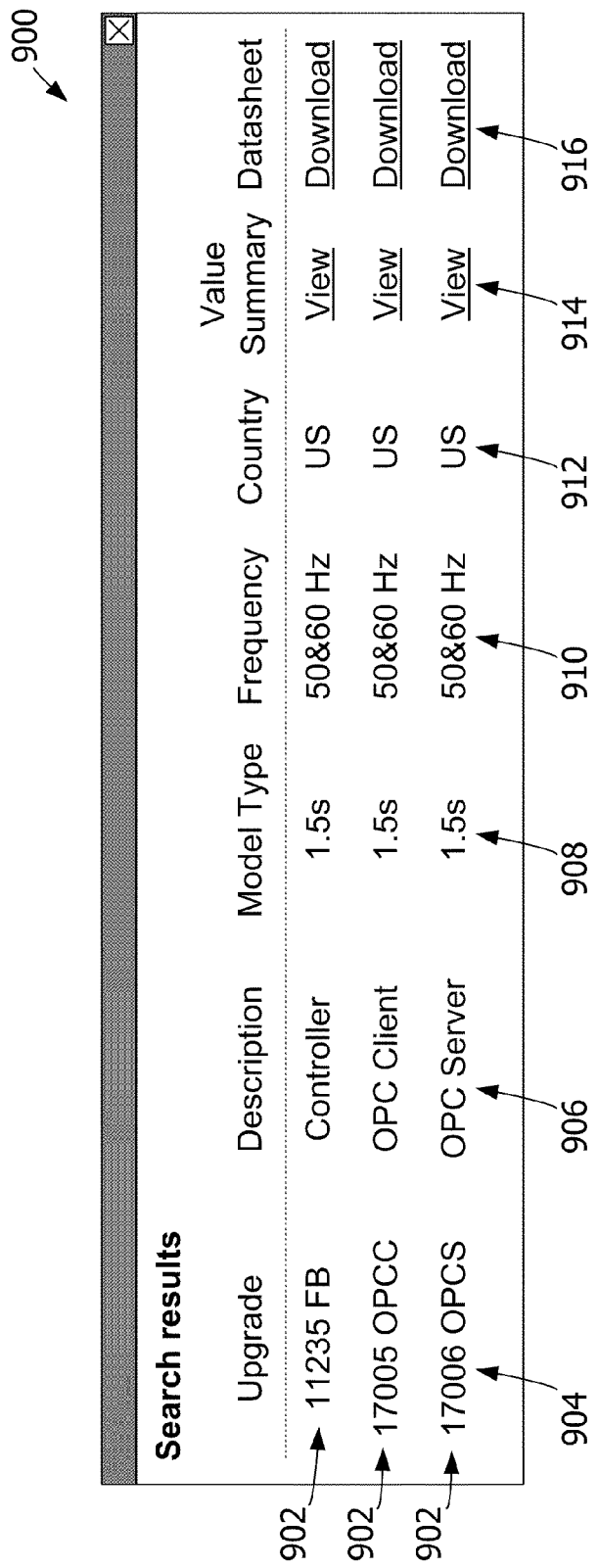
FIG. 9 is an exemplary user interface for viewing upgrade search results produced by initiating a search in the user interface shown in FIG. 8.

FIG. 9 is an exemplary user interface 900 for viewing upgrade search results 902 produced by initiating a search in user interface 800. Search results 902 may be produced, for example, by user computer device 210 or central server computer device 250. Each search result 902 corresponds to an available upgrade. For example, an upgrade may include, without limitation, a hardware component, a software component, and/or a consumable component. For each search result 902, user interface 900 includes an upgrade name 904, an upgrade description 906, a wind turbine model 908, an electrical output frequency 910, and a country 912. User interface also includes a summary link 914 and a datasheet link 916 for each search result 902. In response to user 520 selecting datasheet link 916, user interface 900 initiates a download of detailed information for the corresponding upgrade. In response to user 520 selecting summary link 914, user interface 900 displays an upgrade summary, as shown in FIG. 10.

Figure 10:
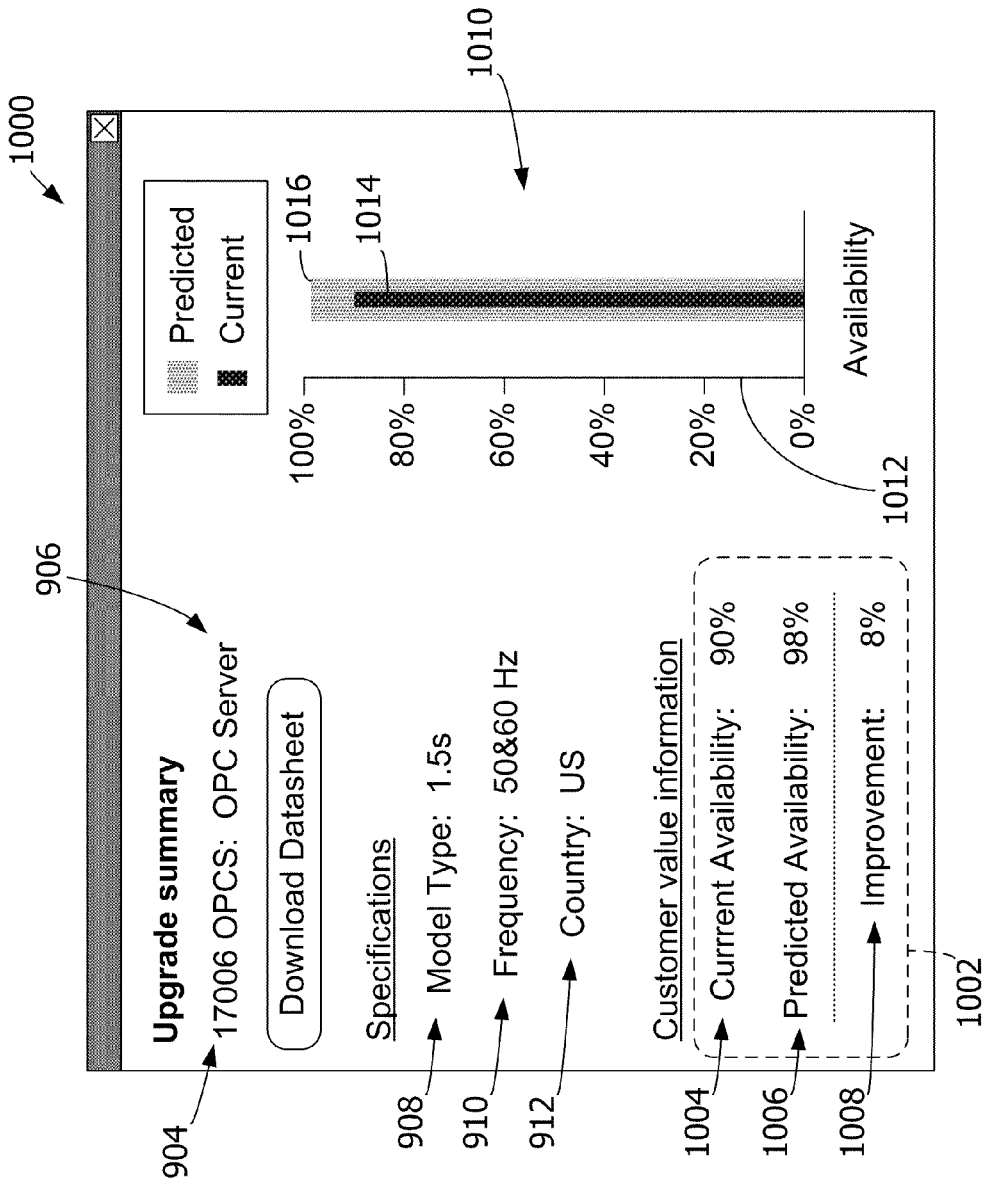
FIG. 10 is an exemplary user interface for viewing an upgrade summary for an upgrade listed in the user interface shown in FIG. 9.

FIG. 10 is an exemplary user interface 1000 for viewing an upgrade summary for an upgrade listed in user interface 900. User interface 1000 may be displayed for one or more wind turbines. For example, user interface 1000 may include information for a single wind turbine or all wind turbines within a wind turbine site.

User interface 1000 includes upgrade name 904, upgrade description 906, wind turbine model 908, electrical output frequency 910, and country 912. User interface 1000 also includes performance data 1002 for a wind turbine and/or wind turbine site. In an exemplary embodiment, user interface 1000 includes a current availability 1004 for a wind turbine. Current availability 1004 corresponds to target performance data, such as shown in FIG. 7. User interface 1000 also includes a predicted availability 1006. For example, predicted availability 1006 may be calculated based on performance data corresponding to wind turbines including the upgrade. User interface also includes a performance improvement 1008 indicating the difference between predicted availability 1006 and current availability 1004.

User interface 1000 also graphically represents performance data 1002. In an exemplary embodiment, user interface 1000 includes a bar chart 1010 graphically representing current availability 1004 and predicted availability 1006. Bar chart 1010 includes a y-axis 1012 corresponding to availability, expressed as a percentage of time. Current availability 1004 is graphically represented as a current availability indicator 1014. Predicted availability 1006 is graphically represented as a predicted availability indicator 1016. As shown in FIG. 10, current availability indicator 1014 and predicted availability indicator 1016 are displayed as juxtaposed vertical bars. Such an embodiment facilitates convenient evaluation of a potential upgrade.

The methods described herein may be encoded as executable instructions embodied in a computer readable medium including, without limitation, a memory area of a computer device. Such instructions, when executed by a processor, cause the processor to perform at least a portion of the methods described herein.

Exemplary embodiments of a wind turbine monitoring system are described above in detail. The system, devices, wind turbine, and included assemblies are not limited to the specific embodiments described herein, but rather each component may be utilized independently and separately from other components described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for indicating a performance of a wind turbine, the system comprising:
  a database system for storing performance data for a plurality of known wind turbines; and,
  a hardware server system coupled to the database system, the server system configured to:

acquire, from the database system, performance data corresponding to one or more target wind turbines to create target performance data, the target wind turbines including a subset of the known wind turbines;

acquire, from the database system, performance data corresponding to one or more baseline wind turbines to create baseline performance data, the baseline wind turbines including a subset of the known wind turbines not included in the target wind turbines; and, provide, to a client system, a relative performance profile relating the target performance data to the baseline performance data.

2. A system in accordance with claim 1, wherein the server system is further configured to:

for a first target wind turbine of the target wind turbines, identify an available upgrade not included in the first target wind turbine;

compare target performance data corresponding to the first target wind turbine to baseline performance data corresponding to a known wind turbine including the available upgrade to determine a predicted performance improvement; and, provide the predicted performance improvement to the client system.

3. A system in accordance with claim 1, wherein the server system is further configured to:

receive recent performance data corresponding to a first known wind turbine of the plurality of known wind turbines; and, store the recent performance data in the database system, wherein the baseline performance data include the recent performance data.

4. A system in accordance with claim 3, wherein the server system is further configured to repeatedly receive and store recent performance data corresponding to the first known wind turbine.

5. A system in accordance with claim 1, further comprising:

a site server computer device configured to receive site performance data for a plurality of known wind turbines at a wind turbine site, wherein the server system is further configured to:

receive the site performance data from the site server computer device; and, store the site performance data in the database system, wherein the target performance data or the baseline performance data include the site performance data.

6. A system in accordance with claim 5, wherein the site performance data are first site performance data for a first wind turbine site, and the server system is further configured to:

receive second site performance data for a second wind turbine site; and compare the first site performance data to the second site performance data to create the relative performance profile.

7. A system in accordance with claim 1, wherein the server system is further configured to define the baseline wind turbines by identifying known wind turbines having at least one attribute that is substantially similar to an attribute of the target wind turbines, the at least one attribute comprising at least one of the following: a geographic attribute and an environmental attribute.

8. A system in accordance with claim 1, wherein the performance data include fault occurrence data, and the server system is further configured to compare target fault occurrence data from the target performance data to baseline fault occurrence data from the baseline performance data to create the relative performance profile.

9. A system in accordance with claim 1, wherein the server system is further configured to provide the relative performance profile to the client system by providing a graphical representation of the relative performance profile.

10. A system in accordance with claim 9, further comprising the client system, wherein the client system is configured to display the graphical representation of the relative performance profile using a presentation device.

11. A method for indicating a performance of a wind turbine, the method comprising:

providing a database system for storing performance data for a plurality of known wind turbines; and providing a hardware server system coupled to the database system, the server system configured to:

acquire performance data for one or more target wind turbines to create target performance data;

calculate, by a processor, baseline performance data based at least in part on performance data for a plurality of baseline wind turbines;

compare, by the processor, the target performance data to the baseline performance data to create a relative performance profile; and, create a graphical representation of the relative performance profile for display by a user computer device.

12. A method in accordance with claim 11, wherein the hardware server system is further configured to define the baseline wind turbines by identifying known wind turbines having at least one attribute that is substantially similar to an attribute of the target wind turbines, the at least one attribute comprising at least one of the following: a dimensional attribute, an electrical output attribute, a geographic attribute, and an environmental attribute.

13. A method in accordance with claim 11, wherein the hardware server system is further configured to define the baseline wind turbines by identifying known wind turbines associated with a wind condition similar to a wind condition associated with the target wind turbines.

14. A method in accordance with claim 11, wherein the hardware server system is further configured to:

identify an available upgrade for a first target wind turbine of the target wind turbines, the first wind turbine not including the available upgrade;

compare target performance data for the first target wind turbine to performance data for at least one known wind turbine including the available upgrade to determine a predicted performance improvement for the available upgrade; and provide the predicted performance improvement to the user computer device.

15. A method in accordance with claim 11, wherein the target wind turbines are operated by a first operator, and at least one baseline wind turbine is operated by a second operator, the method further comprising providing the relative performance profile to a user computer device associated with the first operator.

16. A method in accordance with claim 11, wherein acquiring target performance data comprises acquiring performance data for a plurality of known wind turbines within a wind turbine site, and creating a relative performance profile comprises creating a relative performance profile for the wind turbine site.

17. A method in accordance with claim 16, wherein the wind turbine site is a first wind turbine site, the method further comprising calculating the baseline performance data based at least in part on performance data for a plurality of baseline wind turbines within a second wind turbine site.

18. A method in accordance with claim 11, wherein calculating the baseline performance data comprises calculating an average performance metric including at least one of the following: an average fault occurrence rate, an average availability rate, and an average electrical output.

19. A method in accordance with claim 18, wherein the hardware server system is further configured to:
   calculate a target performance metric based at least in part on the target performance data, the target performance metric including at least one of the following: a fault occurrence rate, an availability rate, and an electrical output;
   compare the target performance metric to the average performance metric to create the relative performance profile; and,
   create a graphical representation of the relative performance profile by creating a graphical representation of the target performance metric relative to the average performance metric.

20. A system for indicating a predicted performance improvement for an upgrade to a wind turbine, the system comprising:
   a database system for storing performance data for a plurality of known wind turbines; and,
   a hardware server system coupled to the database system, the server system configured to:
      provide, to a client system, a relative performance profile relating performance data for a target wind turbine to performance data for one or more baseline wind turbines;
      identify an available upgrade not included in the target wind turbine;
      compare the performance data corresponding to the target wind turbine to performance data corresponding to one or more known wind turbines including the available upgrade to determine a predicted performance improvement; and,
      provide the predicted performance improvement to the client system.

* * * * *